United States Patent Office 2,893,914
Patented July 7, 1959

2,893,914

THIADICARBOCYANINE ANTHELMINTIC COMPOSITIONS AND METHODS OF USING THEM

Max C. McCowen and Paul F. Wiley, Indianapolis, Ind., assignors to Eli Lilly and Company, Indianapolis, Ind., a corporation of Indiana No Drawing. Application September 18, 1958
Serial No. 761,681

11 Claims. (Cl. 167—53)

This is a continuation-in-part of our United States patent application Serial Number 675,567, filed August 1, 1957, now abandoned.

This invention relates to therapeutic anthelmintic compositions and processes. More particularly, this invention is directed to therapeutic compositions containing certain thiadicarbocyanines, and acid addition salts thereof, and to methods of using them in the treatment of parasitic infections.

It is well known that certain helminths are parasitic and infect especially the gastrointestinal tract of man and other animals. Such parasitic infection, or helminthiasis, is said to be the most prevalent disease in the world.

Helminthiasis has more manifest and serious consequences than the mere necessity of increasing nutrient intake by the host. In addition to malnutrition, which almost inevitably is produced, the diseased host may suffer from an extensive damage to intestinal mucosa resulting in hemorrhaging because of burrowing and attachment by the parasite. Moreover, the toxemia caused by absorption of excreta of the parasites, and the intestinal blocks produced in some advance and uncontrolled cases of helminthiasis can lead to prostration and death. It is obvious from the above, that helminthiasis is a disease of major concern and that it is of utmost importance to have effective methods and therapeutic compositions as treatment.

It is an object of this invention to provide for the treatment of helminthiasis, new and improved broad-spectrum pharmaceutical compositions free from heretofore encountered undesirable qualities. A further object of this invention is to provide a safe, convenient and effective process for the treatment of helmintic infection. Other objects of the invention will be apparent from the disclosure hereinafter made.

In accordance with the above and other objects, we have provided new broad-spectrum anthelmintic compositions comprising a suitable extending medium with which there is associated a dose amount of a thiadicarbocyanine salt represented by the following formula

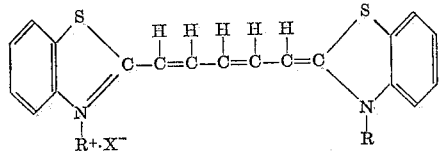

wherein R is a lower alkyl radical and X is a physiologically compatible anion. Moreover, we have provided new and improved processes for treatment of helminthiasis, comprising the administration of compositions of the above character.

For therapeutic application or use, the thiadicarbocyanine compounds are provided in the form of physiologically compatible compositions comprising a selected thiadicarbocyanine salt of the formula given above in association with a physiologically compatible excipient, for example, a pharmaceutical extending medium. The extending medium can, and for human use preferably does comprise at least in part, a material of enteric character, that is, one which when associated with the medicament maintains the medicament in inert or inoperative form so long as the composition remains in the acidic stomach, but which releases the medicament when the composition reaches the intestine. By such means the medicament is rendered bland to the gastromucosa thereby avoiding the possibility of gastric irritation and upset.

The provision of such enteric property can be accomplished by coating the thiadicarbocyanine tablets and the like with one of the commonly employed enteric coatings such as those containing fatty acids, shellacs, resins, cellulose derivatives, waxes, synthetic polymers, and the like or combinations thereof, as, for example, those described in U.S. Patents No. 2,196,768, No. 2,373,- 763, No. 2,433,244, No. 2,455,790, No. 2,512,192, No. 2,540,979, and No. 2,714,084. We have found that a preferred coating composition for the purpose of our invention comprises cellulose acetate phthalate. Alternatively, the medicament can be rendered enteric in character by adsorbing it on a suitable adsorbent, such as a bentonite. The adsorbent-medicament combination can then be fabricated into tablets, filled capsules, suspensions, and the like. The preparations can contain additional ingredients such as buffers, binders, preservatives, flavors, emulsifying agents, and the like, as may be desired.

Although the above compositions are designed primarily for human use, they can also be employed in suitable dosage amount for the treatment of animals, such as house pets and economically important domesticated and other animals, e.g., cattle, swine, and poultry. However, for the treatment of animals, it is generally more convenient to incorporate the thiadicarbocyanine in a physiologically compatible excipient such as a dietary component of the animal to be treated. Thus, the animal can receive its medication with its normal food intake. Alternatively, the thiadicarbocyanine compound can be associated in suitable dose amount with a physiologically compatible excipient which is edible, but is not a normal dietary constituent, and consequently may not be physiologically utilizable, for example, an ion exchange resin. Either type of blended mixture can readily be administered to the animal by adding it to or mixing it with the feed of the animal in proper dosage amount. If desired, the thiadicarbocyanine compound can be blended with a fabricated animal feed in such amount that the medicated feed when consumed in normal daily quantity by the animal provides a therapeutically effective dose amount of the thiadicarbocyanine compound.

For the treatment of humans, the daily dosages of the thiadicarbocyanine compounds employed in this invention desirably range from about 0.2 to about 2.0 grams, or from about 5 to about 30 mg./kg. of body weight. The administration of such dose amounts daily is continued for a period of about two to twenty days. A preferred adult treatment consists of the oral administration of about 200 mg. of a thiadicarbocyanine compound in the form of enteric-coated tablets two or three times per day for about five to eight days. In the treatment of children, a preferred treatment is 5 mg./lb. of the child's weight given orally twice daily for five days, the total daily dose not exceeding about 600 mg. If the infected child is very young or if he does not readily ingest the enteric-coated tablets, it is desirable to administer the medicament in the form of a suspension such as is disclosed hereinafter. It is to be understood, however, that the daily dosages and the length of treatment are largely dependent upon conditions such as age and general physical condition of the infected patient, severity and nature of the infection, and the desired rapidity of action of the therapy.

For veterinary purposes in the treatment of animals, the thiadicarbocyanine compound preferably is administered daily in single or divided quantities in the amount of about 5 to about 30 mg./kg. of animal body weight, and administration is continued for a period of about three to twenty or more days. The presently preferred treatment regimen comprises a treatment period of about ten to twenty days and a daily dose amount of about 15 to 20 mg./kg. of body weight. An alternative mode of treatment is the maintenance of the animal on a lesser dosage amount of thiadicarbocyanine compound than the preferred range mentioned above, for a relatively long period of time. By such means the animal is gradually freed from helminth infection and is maintained free from infection. This mode of treatment is adaptable to animals being groomed for slaughter and marketing, since the helminth-free animal can exhibit a greater feed efficiency and weight gain than an infected animal.

The above-described methods of treatment substantially, if not completely, free the infected host of such important helminths as roundworms, threadworms, hookworms, pinworms, and poultry worms, thereby providing the enhanced safety and convenience of the long-sought but previously unavailable broad-spectrum anthelmintic therapy. A further virtue of this broad-spectrum treatment is that it provides for the first time effective oral anthelmintic therapy against whipworm infection whereas the heretofore known narrow-spectrum treatments of whipworm infection were relatively ineffective in addition to requiring hospitalization and enema administration.

The employment of the compositions described herein affords advantages not heretofore realizable. We have, for the first time, provided broad-spectrum anthelmintic compositions which are substantially free from unwanted side reactions such as vomiting, nausea, dizziness, diarrhea, epigastric pain and the like reactions which were inevitable attendants of previously known anthelmintics. Moreover, the compositions and methods of this invention appear to cause no damage to tissues such as those of the kidneys and liver, such as has been observed following the administration of other anthelmintic compositions. Moreover, with previously available methods of treating helminthiasis, auxiliary procedures were often necessary such as pretreatment fasting, enema administration, and purgation. However, in the employment of our novel compositions, such supportive or supplemental measures are neither required nor advisable.

The thiadicarbocyanines employed in our compositions can be synthesized by the method described by Sitnik and Steingardt in Journal of Applied Chemistry (U.S.S.R.) 9, 1842 (1936). By this method salts are supplied in which the anion associated with the thiadicarbocyanine is iodide, ethyl sulfate, and the like. Other salts such as for example the chloride, bromide, phenolphthalein, and the like can be made from the above-mentioned iodide or other anionic salts by methods well known to the art. The iodide is a preferred salt because of the relative ease of its preparation.

The following are illustrative of preparations incorporating a thiadicarbocyanine salt to provide novel compositions of this invention.

Filled gelatin capsules

One part by weight of 3,3'-diethylthiadicarbocyanine iodide is uniformly mixed with two parts by weight of lactose, and the mixture is filled in 300 mg. amounts into gelatin capsules. The administration of from two to ten capsules per day for adults is recommended for the treatment of helminthiasis.

Enteric type suspension

An aqueous suspension of the phenolphthalein salt of 3,3' - diethylthiadicarbocyanine, constituted to contain about 20 mg. of 3,3'-diethylthiadicarbocyanine per milliliter of suspension, and especially adapted for pediatric use, is prepared as follows:

5 g. of 3,3'diethylthiadicarbocyanine iodide are added with stirring to an admixture of 0.4 g. of potassium hydroxide and about 125 ml. of water. About ten minutes subsequent to the above addition, 15 ml. of a liquid soap are introduced to the mixture with continued stirring, followed by the addition of 50 ml. of a basic aqueous solution (1.2 g. of potassium hydroxide) to which has been added 3.2 g. of phenolphthalein. 20 ml. of 2 N hydrochloric acid are added dropwise to the mixture with gentle stirring until a gelatinous formation results. The stirring is then accelerated and is continued until a bright blue precipitate forms. The precipitate which comprises the phenolphthalein salt of 3,3'-diethylthiadicarbocyanine is separated by filtration, is washed twice with 300 ml. volumes of water, and is air dried. About 18.75 g. of methyl celllose (viscosity 1500 centipoises) is dissolved in a mixture of 30 ml. of glycerin and 30 ml. of water. To the methyl cellulose solution is added with sufficiently gentle stirring to prevent foaming an aqueous solution consisting of 950 ml. of water, 0.15 g. of butyl-p-hydroxybenzoate, 0.30 g. propyl-p-hydroxybenzoate and 0.30 g. methyl-p-hydroxybenzoate. To the resulting mixture are added with continued gentle stirring 2.25 g. of anhydrous magnesium sulfate, 1.50 g. of sodium chloride and 4.5 g. of soluble saccharin.

8.75 g. of a purified bentonite (sold under the trademark "Veegum" by The R. T. Vanderbilt Co.) and 60.0 g. of the phenolphthalein salt of 3,3'diethylthiadicarbocyanine are uniformly mixed, and 300 ml. of water are added to the solid mixture with stirring to form a smooth paste. The paste is added with stirring to the methyl cellulose solution, and then are added 1.5 ml. of wild cherry extract and 0.27 ml. of an anti-foam agent acceptable for use in food products. The volume of the mixture is brought to 1500 ml. by the addition of distilled water, the mixture is homogenized, and is bottled.

Tablets 1100 g. of starch are mixed thoroughly with 1000 g. of 3,3'-diethylthiadicarbocyanine iodide. To the mixture are added about 3400 g. of starch in the form of an aqueous starch paste, and the resulting mixture is granulated in the usual manner. To the granulation are added a mixture of 130 g. of starch powder and about 26 g. of magnesium stearate, and the whole is mixed to form a uniform composition. The mixture is then compressed on a tableting machine into tablets of such size as to provide about 100 mg. of thiadicarbocyanine salt per tablet.

The tablets can be provided with a simple sugar coating and bottled. Preferably, however, they are coated with an enteric coating, for example, cellulose acetate phthalate. The enteric coating is applied in the customary manner by coating the tablets in a rotating coating pan with alternate layers of cellulose acetate phthalate and talc until a coating of sufficient thickness is obtained. The coated tablets are then preferably given a final sugar coating.

Veterinary preparation

The following ingredients are combined and thoroughly mixed to provide 100 kg. of a premix suitable for use in the treatment of house pets such as cats and dogs.

| | Kg. |
|---|---|
| Dried skim milk | 20 |
| Corn oil meal | 25 |
| Dried meat scraps | 5 |
| Soybean oil meal | 5 |
| Vanilla cookie crumbs | 25 |
| Toasted cornflakes | 14 |
| 3,3'-diethylthiadicarbocyanine iodide | 6 |

The foregoing palatable mixture can be sprinkled upon or mixed with such food as the animal is to receive, the amount of mixture used being sufficient to provide a therapeutic quantity of the thiadicarbocyanine compound. Alternatively, the mixture can be employed as a premix, in which case it can be distributed to feed manufacturers, such as manufacturers of commercial dog and cat foods, for incorporation in prepared foods, for example, those marketed in sealed tins. The inclusion of about one percent by weight of the above mixture in a prepared food will furnish to the animal a dose amount of about 15 to 20 mg. of thiadicarbocyanine compound per kilogram of the animal's body weight when the animal is given the medicated feed in normal dietary amount.

*Veterinary preparation*

The following ingredients are combined and thoroughly mixed to provide 100 kg. of a mixture especially suitable for use in the treatment of animals, especially the herbivorous type, and poultry:

| | Kg. |
|---|---|
| Soybean oil meal | 80 |
| 3,3'-diethylthiadicarbocyanine iodide | 20 |

The mixture can be employed in the same manner as the foregoing veterinary preparation, as by adding it in suitable dose amount to one or more components of the animal's feed at the time of feeding, or by using the mixture as a premix and incorporating it in suitable dose amount with a complete or substantially complete feed. Thus for example, a medicated feed suitable for administration to feeder steers is obtained by blending 5 pounds of the mixture with 2000 pounds of a feed of a type commonly known as supplement and grain ration, which may be a total ration or one to be further supplemented by hay or roughage.

Administration to a feeder steer weighing about 1000 pounds of about 30 pounds of the medicated feed per day provides a dose amount of thiadicarbocyanine compound of about 15 mg./kg. of steer body weight.

We claim:

1. A broad-spectrum anthelmintic medicated feed composition in dosage unit form, comprising a thiadicarbocyanine represented by the following formula

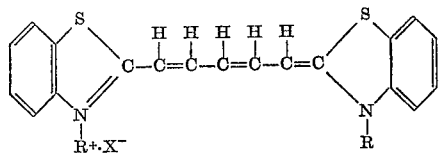

wherein R is a lower alkyl radical and X is a physiologically compatible anion, dispersed in a utilizable feedstuff.

2. A broad-spectrum anthelmintic medicated feed composition in dosage unit form comprising a thiadicarbocyanine represented by the following formula

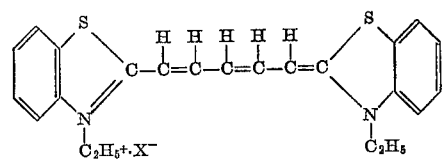

wherein X is a physiologically compatible anion, dispersed in a utilizable feedstuff.

3. A broad-spectrum anthelmintic medicated feed compositon comprising in dosage unit form a thiadicarbocyanine represented by the following formula

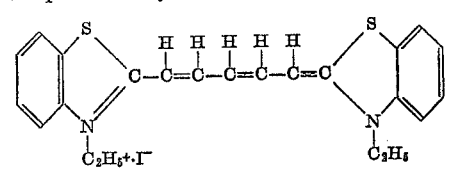

dispersed in a utilizable feedstuff.

4. A broad-spectrum anthelmintic composition comprising a thiadicarbocyanine represented by the following formula

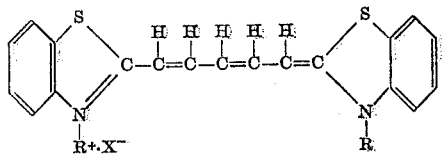

wherein R is a lower alkyl radical and X is a physiologically compatible anion, and a pharmaceutical extending medium comprising at least in part bentonite upon which is adsorbed said thiadicarbocyanine thereby imparting enteric character to the composition.

5. A broad-spectrum anthelmintic dosage unit in enteric-coated tablet form, said tablet comprising a solid pharmaceutical extending medium and a thiadicarbocyanine represented by the following formula

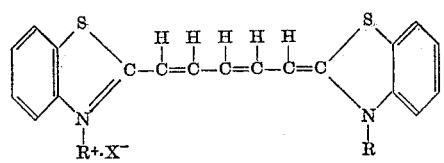

wherein R is a lower alkyl radical and X is a physiologically compatible anion, said tablet being surrounded by an enteric coating.

6. A broad-spectrum anthelmintic dosage unit in enteric-coated tablet form, said tablet comprising a solid pharmaceutical extending medium and a thiadicarbocyanine represented by the following formula

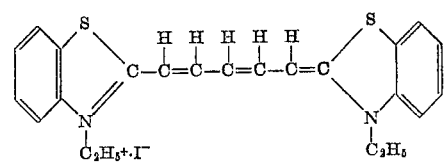

and said tablet being surrounded by an enteric coating.

7. A broad-spectrum anthelmintic dosage unit in tablet form, said tablet comprising a solid pharmaceutical extending medium and at least about 0.1 gram of a thiadicarbocyanine represented by the following formula

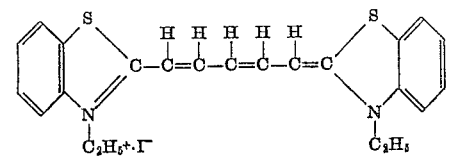

and said tablet being surrounded by a cellulose acetate phthalate enteric coating.

8. A method of treating helminthiasis which comprises orally administering to a host infected with helminthiasis repeated doses of a thiadicarbocyanine represented by the following formula

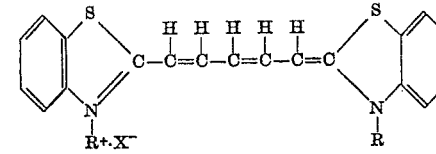

wherein R is a lower alkyl radical and X is a physiologically compatible anion.

9. A method of treating helminthiasis which comprises orally administering to a host infected with helminthiasis repeated daily dose amounts of about 5 to about 30 milligrams per kilogram of host body weight of a thiadicarbocyanine represented by the following formula

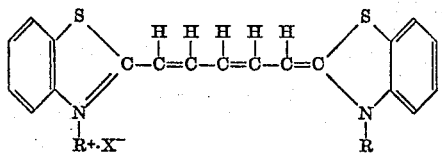

wherein R is a lower alkyl radical and X is a physiologically compatible anion.

10. A method of treating helminthiasis which comprises orally administering to a host infected with helminthiasis repeated daily dose amounts of about 5 to about 30 milligrams per kilogram of host body weight of a thiadicarbocyanine represented by the following formula

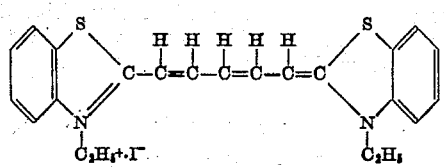

11. A method of treating helminthiasis which comprises orally administering to a host infected with helminthiasis repeated daily dose amounts of about 5 to about 30 milligrams per kilogram of host body weight of a thiadicarbocyanine represented by the following formula

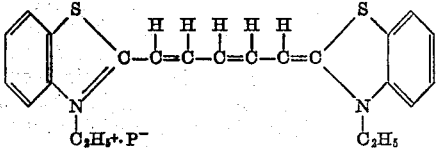

wherein P represents the phenolphthalein anion.

References Cited in the file of this patent

Venkataraman: Synthetic Dyes, vol. II, 1952, p. 1164, Academic Press, Inc., N.Y.

Perez: Santiago, The Am. J. of Tropical Med. and Hygiene, vol. 2, No. 2, March 1953, pp. 307–310.